United States Patent
Filho et al.

(10) Patent No.: US 8,621,964 B2
(45) Date of Patent: Jan. 7, 2014

(54) ROTARY CUTTING TOOL WITH COOLANT PASSAGE DISPOSED IN NON-CIRCULAR RECESS FOR REDUCING STRESS

(75) Inventors: Ruy Frota de Souza Filho, Latrobe, PA (US); Mark Alan Francis, Solon, OH (US)

(73) Assignee: Kennametal Inc., Latrobe, PA (US)

( * ) Notice: Subject to any disclaimer, the term of this patent is extended or adjusted under 35 U.S.C. 154(b) by 64 days.

(21) Appl. No.: 13/304,026

(22) Filed: Nov. 23, 2011

(65) Prior Publication Data
US 2013/0129429 A1 May 23, 2013

(51) Int. Cl.
B23B 27/10 (2006.01)
B23C 5/28 (2006.01)

(52) U.S. Cl.
USPC .................................. 82/50; 407/11

(58) Field of Classification Search
USPC .......... 407/11, 40, 42; 82/50; 408/56; 279/20
See application file for complete search history.

(56) References Cited

U.S. PATENT DOCUMENTS

| | | | |
|---|---|---|---|
| 3,018,675 A * | 1/1962 | Klages et al. | 408/189 |
| 4,606,680 A * | 8/1986 | Striegl | 408/156 |
| 6,017,171 A | 1/2000 | Karlsson | |
| 6,247,878 B1 * | 6/2001 | Musil et al. | 408/1 R |
| 6,811,359 B2 * | 11/2004 | Craig | 407/35 |
| 7,040,844 B1 * | 5/2006 | Daiguji | 407/113 |
| 7,121,769 B2 | 10/2006 | Satran et al. | |
| 7,204,662 B1 * | 4/2007 | Long et al. | 407/34 |
| 7,255,518 B2 | 8/2007 | Wallstrom et al. | |
| 7,270,504 B2 | 9/2007 | Tubinger et al. | |
| 7,931,425 B2 * | 4/2011 | Morrison et al. | 407/11 |
| 7,963,729 B2 * | 6/2011 | Prichard et al. | 407/11 |
| 8,215,878 B2 * | 7/2012 | Rozzi et al. | 407/11 |
| 2006/0260439 A1 | 11/2006 | Tubinger et al. | |
| 2010/0239377 A1 | 9/2010 | Morrison et al. | |
| 2010/0272529 A1 * | 10/2010 | Rozzi et al. | 408/56 |
| 2010/0329804 A1 | 12/2010 | Okumura | |

FOREIGN PATENT DOCUMENTS

| | | |
|---|---|---|
| WO | 98/55254 A1 | 12/1998 |
| WO | 2009112931 A1 | 9/2009 |
| WO | 2010/092807 A1 | 8/2010 |
| WO | 2012047455 A1 | 4/2012 |
| WO | 2012070046 A1 | 5/2012 |

* cited by examiner

*Primary Examiner* — Will Fridie, Jr.
(74) *Attorney, Agent, or Firm* — Larry R. Meenan, Esq.

(57) ABSTRACT

A cutting tool includes a tool body having a plurality of pockets for receiving cutting inserts. Each pocket includes a bottom support surface, an axial support surface, a radial support surface and a corner relief between the bottom support surface and the radial support surface. A non-circular recess is formed proximate the pocket, and a coolant passage is disposed within the recess. The recess reduces a tensile stress of the cutting tool during a machining operation.

10 Claims, 7 Drawing Sheets

ROTARY CUTTING TOOL WITH COOLANT PASSAGE DISPOSED IN NON-CIRCULAR RECESS FOR REDUCING STRESS

BACKGROUND OF THE INVENTION

Rotary cutting tools, such as helical end mills and face mills, are well known in the industry. Conventional helical end mills include those shown on pages 182-216 in Kennametal's Milling Catalog No. 5040, copyright 1995.

One form of helical mill that has been in use for years is a helical mill where the cutting edge of each insert is axially spaced apart from the cutting edge of the next adjacent insert and where the inserts in each helix are staggered such that two or more rows are necessary to produce one complete or "all effective" cutting edge. Such a design is shown by the Kennametal 0 degree Lead-Helical End Mills, as shown on page 188 of the above referenced Milling Catalog. One of the disadvantages of such design is that the lead insert in at least one helix must either be of a different length or offset inward and thus incapable of face milling. This is a result of the need to stagger the inserts in each helix. Consequently, all of the inserts are generally not the same and thus not interchangeable, thus requiring the manufacture and inventory of multiple inserts.

Figure 4:
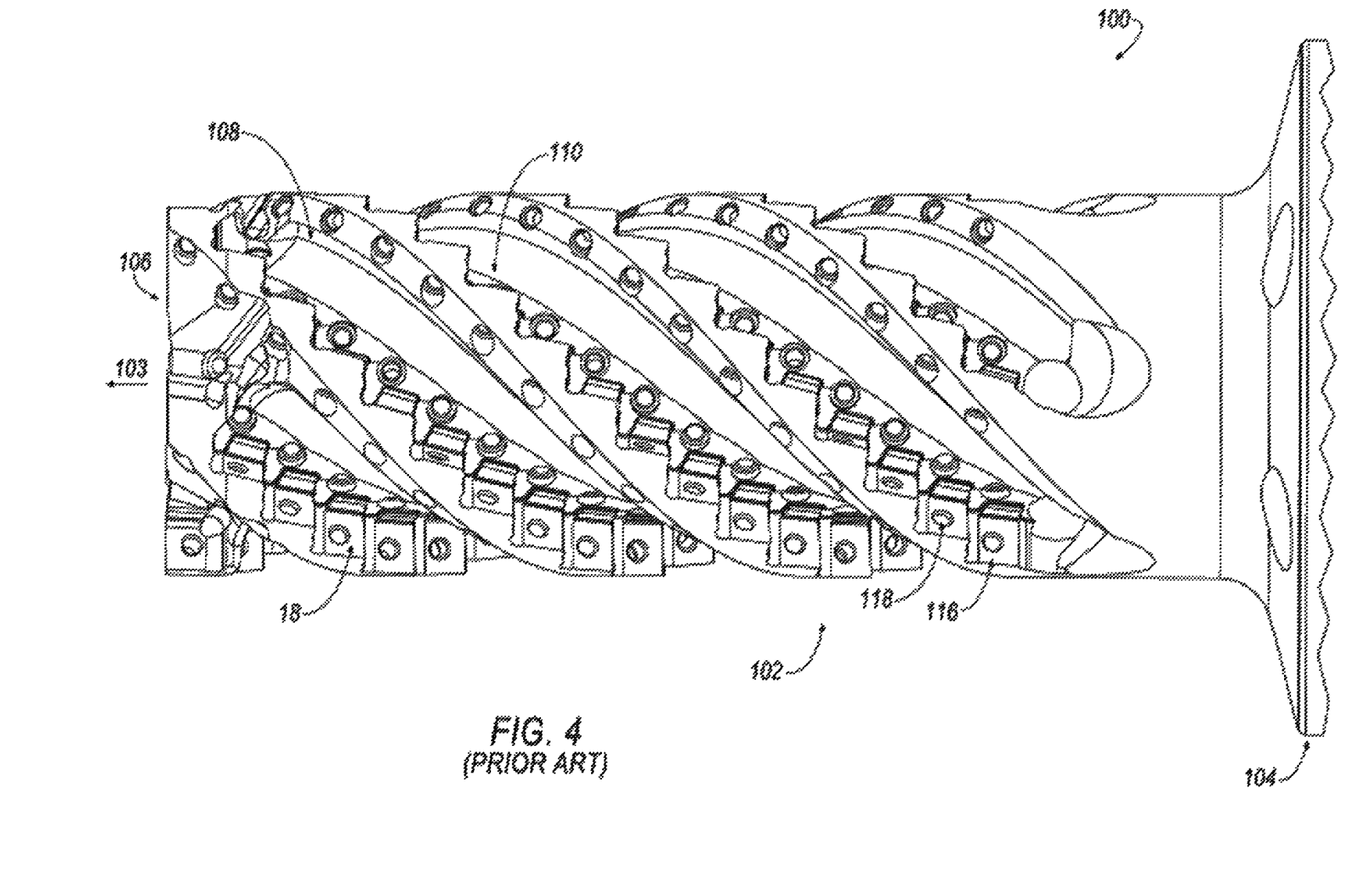
FIG. 4 is an isometric view of a conventional cutting tool.

As shown in FIG. 4, a conventional helical end mill 100 includes a tool body 102 and a shank 104. The shank 104 is configured so as to be capable of insertion and securing within a spindle of a milling or other cutting machine (not shown) as is well known in the art. The tool body 102 is a substantially cylindrical body and has a central, longitudinal axis 103. The tool body 102 extends axially from the shank 104 to an end face 106 thereby defining an exterior surface 108 therebetween. The exterior surface 108 of the tool body 102 preferably includes a plurality of helical grooves or flutes 110. It will be appreciated that most any number of helical grooves may be formed in the tool body 102. Each groove 110 is preferably cut into the exterior surface 108 in a helical or spiral manner that extends from the end face 106 to substantially the shank 104.

An insert (not shown) is affixed to each pocket 116 in each groove 110 using a screw (not shown) with a tapered head insertable through a correspondingly tapered hole (not shown) in each insert and then threaded into a threaded hole 118 in the respective pocket 116.

Figure 5:
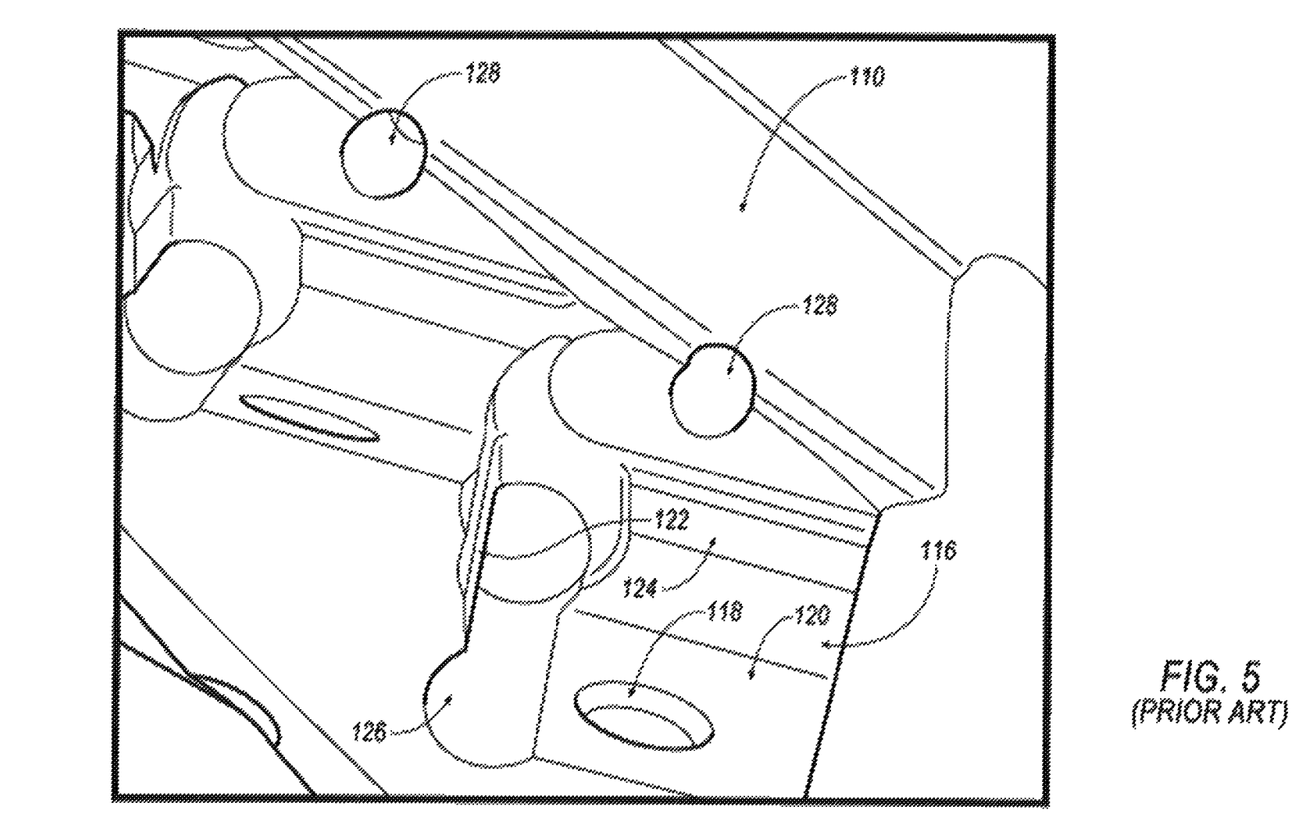
FIG. 5 is an enlarged view of the pocket of the conventional cutting tool of FIG. 4.

As shown in FIG. 5, each pocket 116 has a bottom support surface 120 that may be at an angle with respect to the axis 103. The pocket 116 also includes an axial support surface 122 and an radial support surface 124 that constitute an axial and radial abutment surfaces, respectively, for the side walls of the insert when mounted in the pocket 116. A corner relief 126 is provided between the bottom support surface 120 and the axial support surface 122. The radial support surface 124 in the vicinity of each pocket 116 may include one or more circular coolant passages 128 for providing coolant to the cutting insert and associated workpiece.

Usually when a helical end mill is in operation, the machining force is exerted against one or more edges of the cutter. The resulting bending moment is resisted by the tool holder which rigidly grips the cutter shank. Ignoring the fact that the direction of the moment changes continually as the cutter revolves, the cutter can be considered to be stressed as a cantilever.

Figure 6:
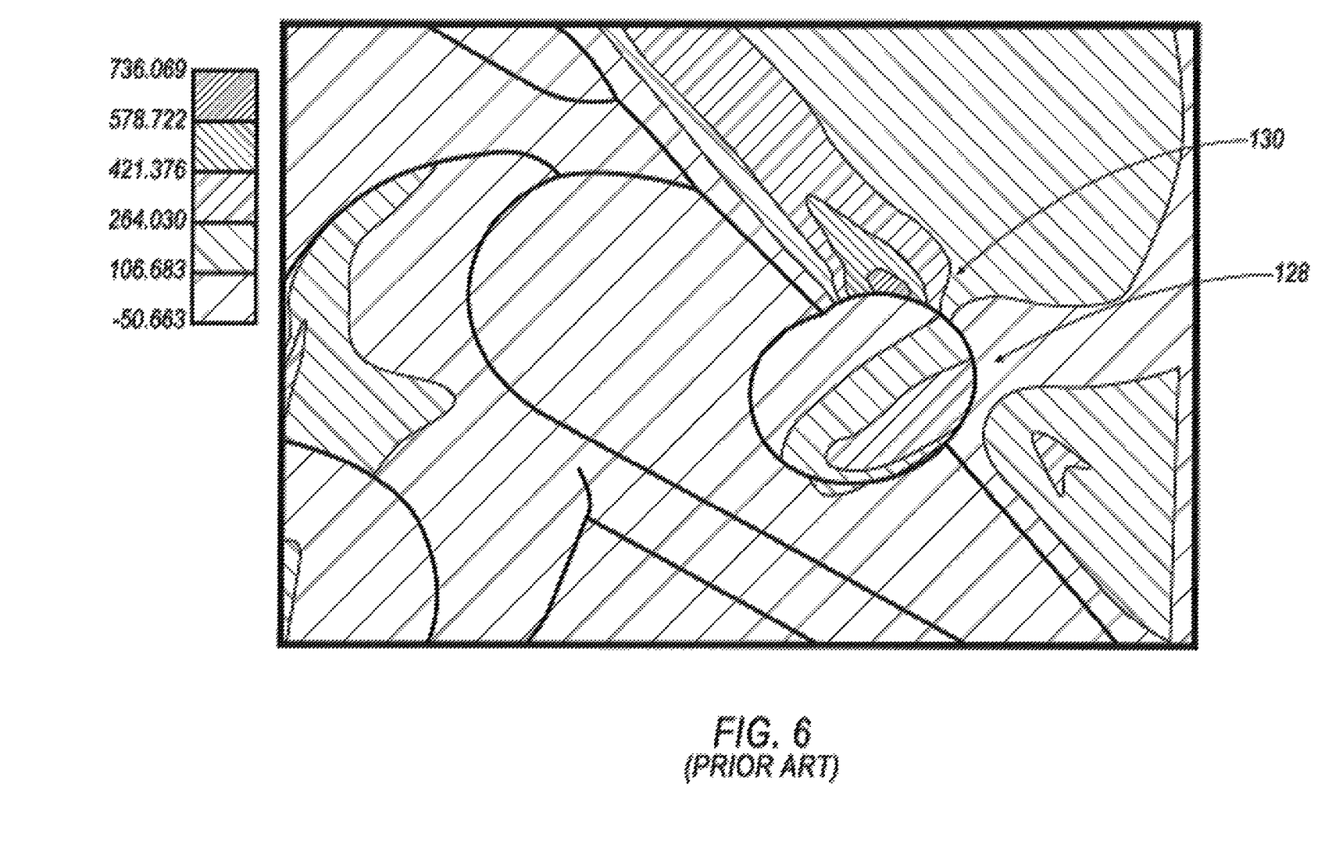
FIG. 6 shows a measurement of the distribution of stress for the pocket of the conventional cutting tool of FIG. 6.

As shown in FIG. 6, simulations have shown that a maximum tensile stress of the pocket 116 during machining operations of approximately 736 MPa (106.76 kpsi) is located at a point 130 proximate the coolant passage 128, resulting in a safety factor for fatigue at 10E6 cycles of about 0.750.

While the matter of stress discussed above is related to avoiding fatigue that would result in tool breakage, no less important is the requirement to minimize tool deflection, in order to improve accuracy and surface finish and to reduce vibration and noise. The bending moment, along with the rotation of the cutter, produces a fully reversed stress condition (alternating tensile and compressive stresses), which is the most devastating condition for fatigue.

Accordingly, there is a need for an improved cutting tool that can overcome the limitations of the known cutting tool, and reduce or eliminate the overall stress of the cutting tool.

SUMMARY OF THE INVENTION

The invention has solved the problem of high stress associated with conventional cutting tools by providing a pocket feature located proximate the area of high stress on the radial support surface that greatly reduces the tensile stress, thereby improving tool safety and lifetime of the tool.

In one aspect, a cutting tool comprises a tool body including a plurality of pockets for receiving cutting inserts, each pocket comprising a bottom support surface, an axial support surface, a radial support surface and a corner relief between the bottom support surface and the radial support surface; a coolant passage proximate at least one of the plurality of pockets; and a non-circular recess surrounding the coolant passage, wherein the non-circular recess reduces a tensile stress in cutting tool during a machining operation.

In another aspect, a cutting tool comprises a tool body including a plurality of pockets for receiving cutting inserts, each pocket comprising a bottom support surface, an axial support surface, a radial support surface and a corner relief between the bottom support surface and the radial support surface; a non-circular recess proximate at least one of the plurality of pockets; and a coolant passage disposed within the non-circular recess, wherein the non-circular recess reduces a tensile stress in cutting tool during a machining operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring to the drawings wherein like reference characters designate like elements there is shown a helical cutting tool 10, such as an end mill, face mill, and the like, according to an embodiment of the invention.

Figure 1:
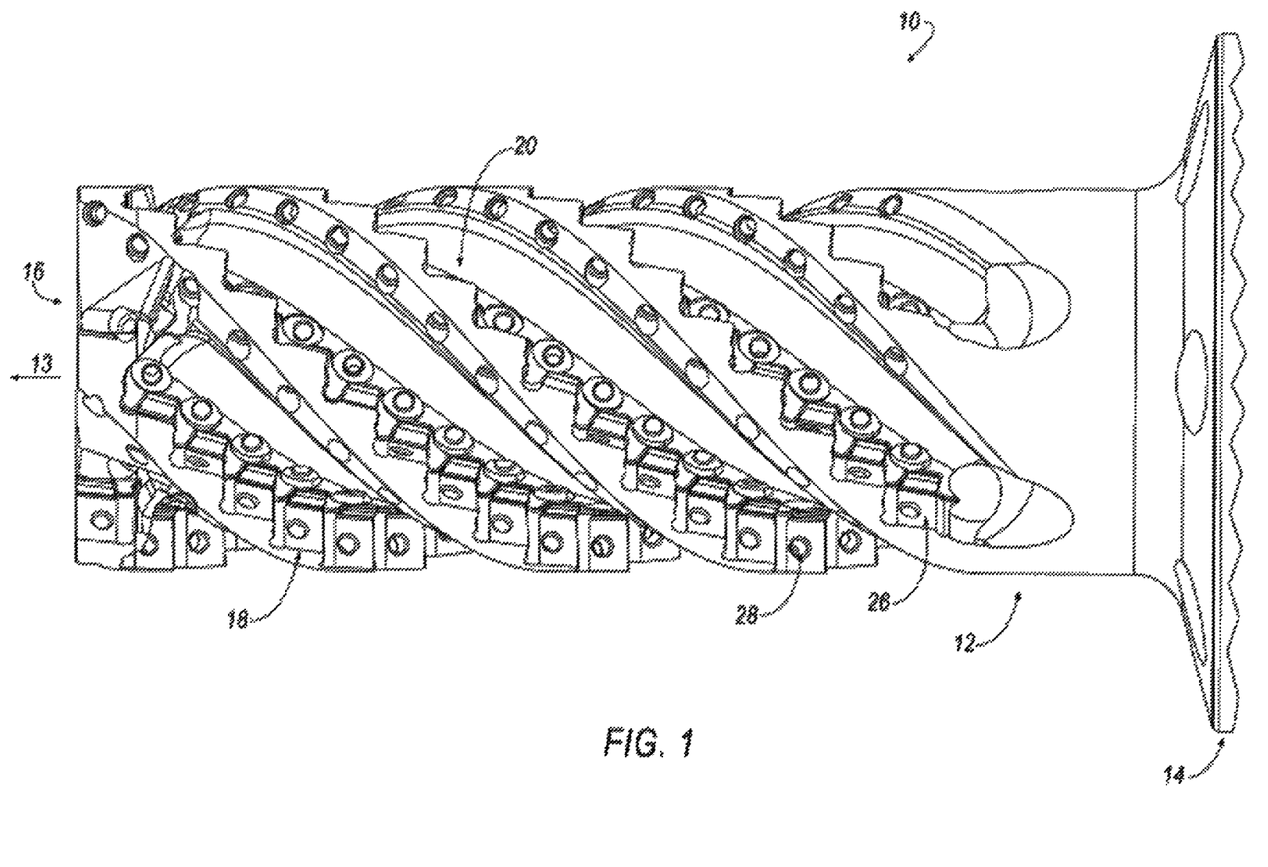
FIG. 1 is a side view of a cutting tool according to an embodiment of the invention.

As shown in FIG. 1, the helical end mill 10 includes a tool body 12 and a shank 14. The shank 14 is configured so as to be capable of insertion and securing within a spindle of a milling or other cutting machine (not shown) as is well known in the art. The tool body 12 is a substantially cylindrical body and has a central, longitudinal rotational axis 13. The tool body 12 extends axially from the shank 14 to an end face 16 thereby defining an exterior surface 18 therebetween. The exterior surface 18 of the tool body 12 preferably includes a plurality of helical grooves or flutes 20. It will be appreciated that most any number of helical grooves may be formed in the tool body 12. Each groove 20 is preferably cut into the exterior surface 18 in a helical or spiral manner that extends from the end face 16 to substantially the shank 14.

As known in the art, an insert (not shown) is affixed to each pocket 26 in each groove 20 using a screw (not shown) with a tapered head insertable through a correspondingly tapered hole (not shown) in each insert and then threaded into a threaded hole 28 in the respective pocket 26. It is within the scope of the invention that any known insert securing method and device may be used including all those well recognized in the art without altering the invention.

The inserts may generally be of any known construction, size, shape, or configuration so long as the inserts securely and properly fit the pocket 34 in the intended manner. Examples of such inserts include those inserts described on pages 7-132 in the above referenced Kennametal Milling catalog. Specific examples include the ADKT or LFEW style inserts described therein.

Figure 2:
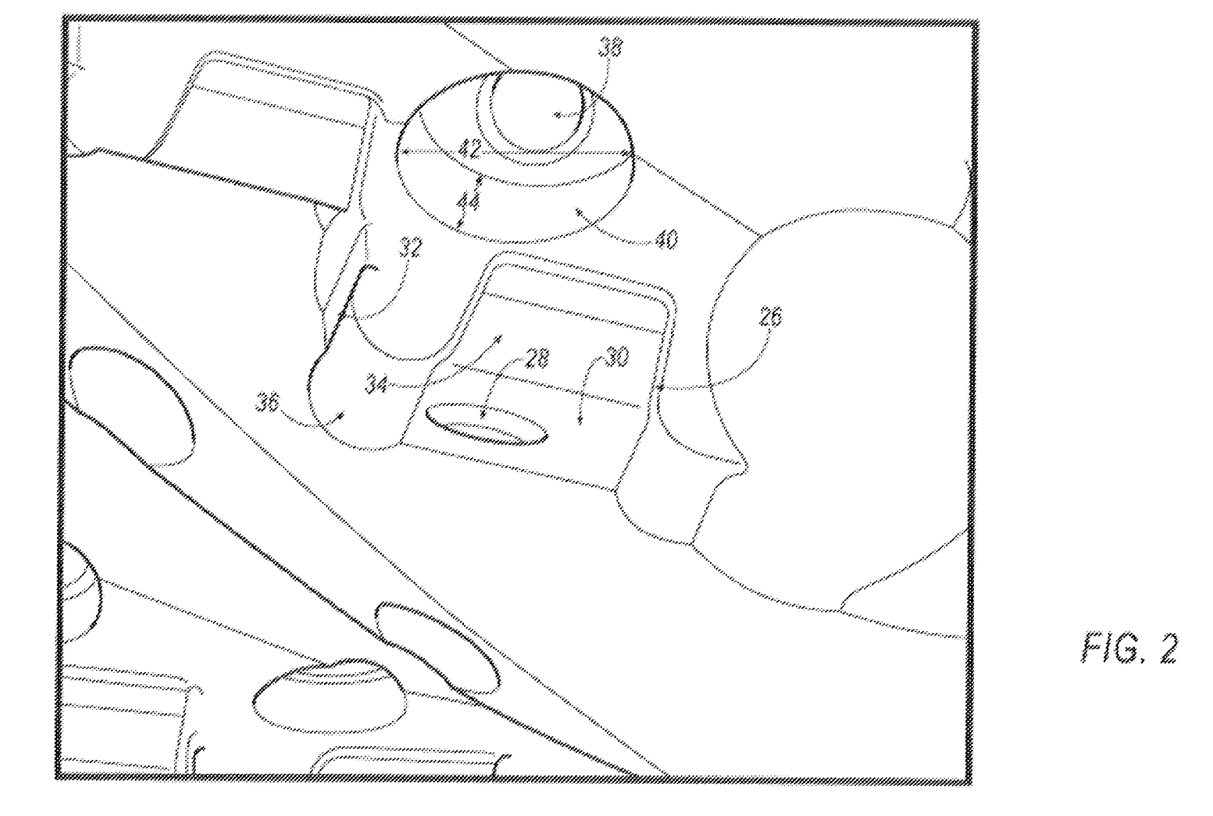
FIG. 2 is an enlarged view of the pocket of the cutting tool of FIG. 1 showing a non-circular recess surrounding a coolant passage for reducing stress according to an embodiment of the invention.

As shown in FIG. 2, each pocket 26 has a bottom support surface 30 that may be at an angle with respect to the axis 13. The pocket 26 also includes an axial support surface 32 and a radial support surface 34 that constitute axial and radial abutment surfaces for the side walls of the insert when mounted in the pocket 26, respectively. A corner relief 36 is provided between the bottom support surface 30 and the axial support surface 32. In the illustrated embodiment, the corner relief 36 has a radius of approximately 0.047 inches (approximately 1.19 mm). However, the radius of the corner relief 36 depends on the design of the cutting insert, and other factors. The cutting tool 10 includes one or more circular coolant passages 38 in the vicinity of each pocket 26 for providing coolant to the cutting insert and associated workpiece.

Up to this point, the helical end mill 10 of the invention is similar to the conventional helical end mill 100. One aspect of the invention is that the helical end mill 10 includes a stress-reducing feature, shown generally at 40, for reducing tensile stress in the helical end mill 10 during machining operations. Specifically, the stress-reducing feature is in the form of a non-circular recess 40 that surrounds the coolant passage 38, as shown in FIG. 2. In other words, the coolant passage 38 is disposed within the non-circular recess 40 of the invention. In the illustrated embodiment, the center of the non-circular recess 40 is substantially aligned with the center of the coolant passage 38. However, it will be appreciated that the center of the stress-reducing feature 40 does not have to be aligned with the center of the coolant passage 38, but can be off-center with respect the coolant passage 38.

The non-circular recess 40 can be oblong, oval or elliptical shaped having a maximum width 42 that is approximately twice the depth 44. In other words, the recess 40 has a width/depth ratio of about 2:1. In general, it has been found that increasing the depth of the recess 40 lowers the tensile stress on the edge of the coolant passage 38. However, it will be appreciated that the invention is not limited by the relative dimension of the recess, and that the invention can be practiced with any desirable width/depth ratio that provides the desired reduction in the overall stress of the tool.

In the illustrated embodiment, the major axis of the non-circular recess 40 is substantially aligned with the rotational axis 13 of the tool 10. However, it will be appreciated that the major axis of the non-circular recess 40 can be oriented at any desirable angle with respect to the rotational axis 13 that will provide the desirable reduction in the overall stress of the tool 10.

Figure 3A:
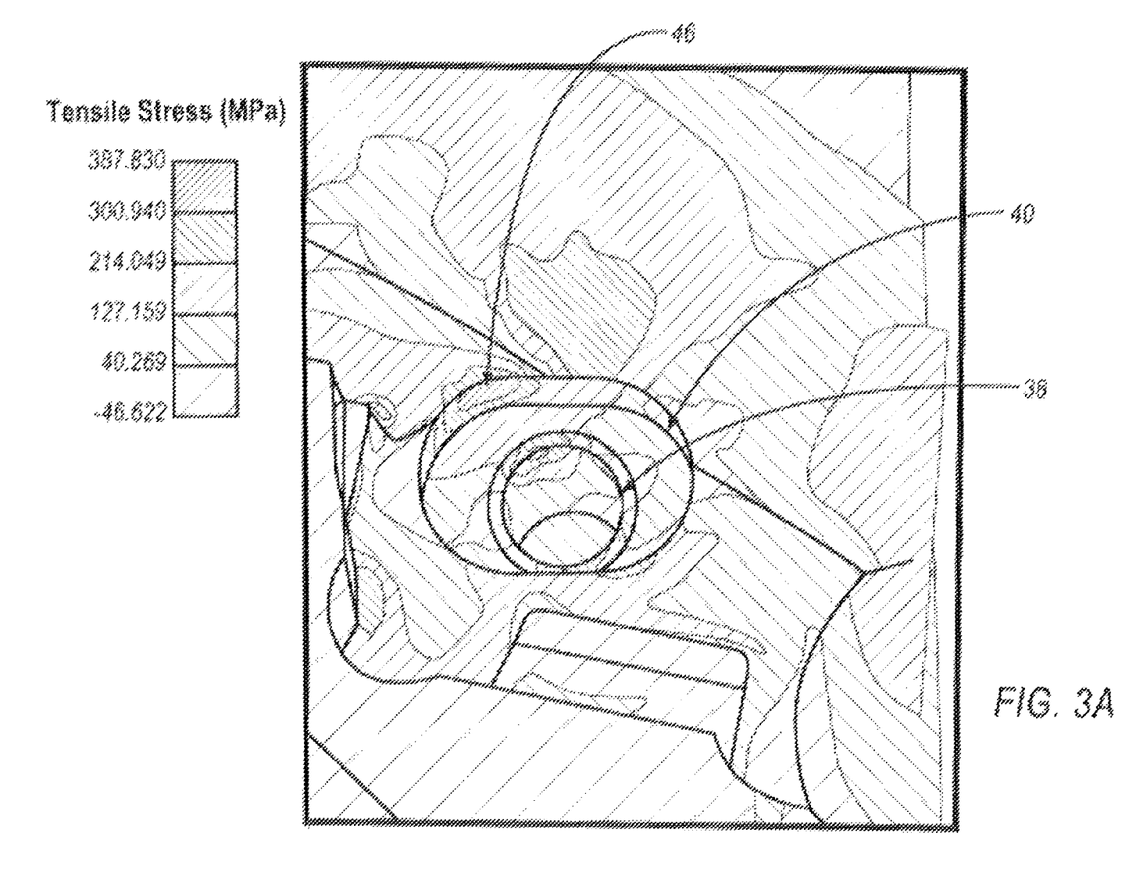
FIGS. 3A and 3B show a measurement of the distribution of stress for the pocket of the cutting tool with the non-circular recess of FIG. 2.

As shown in FIG. 3A, the stress-reducing feature 40 is substantially oblong shaped. Simulations have shown unexpected results that a maximum tensile stress of the pocket 26 during machining operations of approximately 388 MPa (53.1 kpsi) is located at a point 46 proximate the coolant passage 42, as compared to the maximum tensile stress of approximately 736 MPa (106.76 kpsi), which is a reduction of about 50%.

As shown in FIG. 3A, the tensile stress has been more widely dispersed in the direction of the radial support surface 34, and also is no longer located proximate the coolant passage 38. As a result of the non-circular recess 40 of the invention, the maximum tensile stress of the pocket is greatly reduced, resulting in a much larger safety factor for the cutting tool 10, as compared to the conventional cutting tool 100.

Figure 3B:
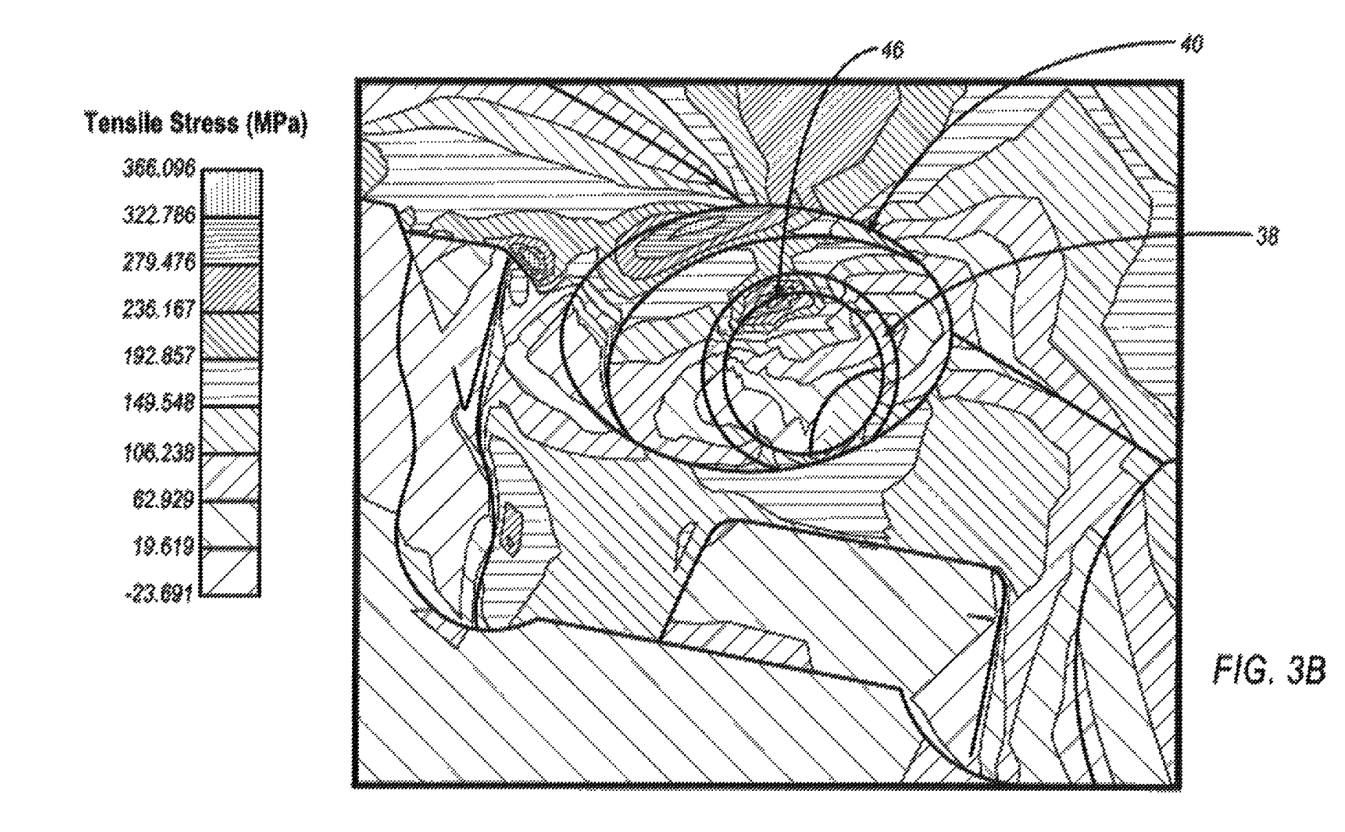

As shown in FIG. 3B, the stress-reducing feature 40 is substantially elliptical shaped. Simulations have shown unexpected results that a maximum tensile stress of the pocket 26 during machining operations of approximately 366 MPa (53.1 kpsi) is located at a point 46 proximate the coolant passage 42, as compared to the maximum tensile stress of approximately 736 MPa (106.76 kpsi), which is a reduction of about 50%. As a result, a safety factor at 10E6 cycles of about 1.471 for fatigue is achieved in the pocket design of the invention, as compared to a safety factor of about 0.75 for fatigue in the conventional pocket design, which is almost a factor of two.

As shown in FIG. 3B, the tensile stress has been more widely dispersed in the direction of the radial support surface 34, and also is no longer located proximate the coolant passage 38. As a result of the non-circular recess 40 of the invention, the maximum tensile stress of the pocket is greatly reduced, resulting in a much larger safety factor for the cutting tool 10, as compared to the conventional cutting tool 100.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting tool comprising:
   a tool body including a plurality of pockets for receiving cutting inserts, each pocket comprising a bottom support surface, an axial support surface, a radial support surface and a corner relief between the bottom support surface and the radial support surface;
   a coolant passage proximate at least one of the plurality of pockets; and
   a non-circular recess surrounding the coolant passage, wherein the non-circular recess reduces a tensile stress in cutting tool during a machining operation.

2. The cutting tool of claim 1, wherein the non-circular recess has a minimum depth that is approximately one-half a maximum width of the recess.

3. The cutting tool of claim 1, wherein the recess is oblong, oval or elliptical shaped.

4. The cutting tool of claim 1, wherein a major axis of the non-circular recess is substantially aligned with a rotational axis of the cutting tool.

5. The cutting tool of claim 1, wherein a center of the non-circular recess is substantially aligned with a center of the at least one coolant passage.

6. A cutting tool comprising:
- a tool body including a plurality of pockets for receiving cutting inserts, each pocket comprising a bottom support surface, an axial support surface, a radial support surface and a corner relief between the bottom support surface and the radial support surface;
- a non-circular recess proximate at least one of the plurality of pockets; and
- a coolant passage disposed within the non-circular recess, wherein the non-circular recess reduces a tensile stress in cutting tool during a machining operation.

7. The cutting tool of claim 6, wherein the non-circular recess has a minimum depth that is approximately one-half a maximum width of the recess.

8. The cutting tool of claim 6, wherein the recess is oblong, oval or elliptical shaped.

9. The cutting tool of claim 6, wherein a major axis of the non-circular recess is substantially aligned with a rotational axis of the cutting tool.

10. The cutting tool of claim 6, wherein a center of the non-circular recess is substantially aligned with a center of the at least one coolant passage.

* * * * *